United States Patent [19]
Bastard et al.

[11] Patent Number: 5,402,071
[45] Date of Patent: Mar. 28, 1995

[54] GROUND FAULT MONITORING DEVICE FOR AN ELECTRICAL POWER DISTRIBUTION SYSTEM

[75] Inventors: Patrick Bastard, Le Havre; Michel Meunier, Morsang sur Orge, both of France

[73] Assignees: Merlin Gerin; Ecole Superieure d'Electricite, both of France

[21] Appl. No.: 43,373

[22] Filed: Apr. 6, 1993

[30] Foreign Application Priority Data

Apr. 28, 1992 [FR] France .................. 92 05346

[51] Int. Cl.[6] ........................................ G01R 31/02
[52] U.S. Cl. .................... 324/509; 324/500; 361/42; 361/85
[58] Field of Search ............... 324/500, 509, 510, 511, 324/521, 522; 361/42, 44, 85

[56] References Cited

U.S. PATENT DOCUMENTS

| | | | |
|---|---|---|---|
| 4,562,507 | 12/1985 | Kudo et al. | 361/85 |
| 4,811,154 | 3/1989 | Trenkler et al. | 361/93 |
| 4,821,137 | 4/1989 | Wilkinson | 361/80 |
| 4,825,323 | 4/1989 | Wilkinson | 361/65 |
| 4,851,782 | 7/1989 | Jeerings et al. | 324/509 X |
| 4,855,861 | 8/1989 | Bergman et al. | 324/522 X |
| 4,858,057 | 8/1989 | Maier et al. | 361/94 |
| 4,868,704 | 9/1989 | Cavero | 324/522 X |
| 4,985,843 | 1/1991 | Kotani | 324/522 X |
| 5,032,785 | 7/1991 | Mathis et al. | 324/107 |

FOREIGN PATENT DOCUMENTS

| | | | |
|---|---|---|---|
| 0087700 | 9/1983 | European Pat. Off. | H02H 3/38 |
| 0255659 | 2/1988 | European Pat. Off. | H02H 3/42 |
| 0256341 | 2/1988 | European Pat. Off. | H02H 3/38 |
| 0316204 | 5/1989 | European Pat. Off. | H02H 3/38 |
| 0319151 | 6/1989 | European Pat. Off. | H02H 3/38 |
| 0389749 | 10/1990 | European Pat. Off. | G01R 21/127 |

*Primary Examiner*—Kenneth A. Wieder
*Assistant Examiner*—Glenn W. Brown
*Attorney, Agent, or Firm*—Parkhurst, Wendel & Rossi

[57] ABSTRACT

The monitoring device comprises a measuring channel of the ground fault voltage, a measuring channel of the ground fault current, and a digital processing circuit whose role is to search for and indicate the presence of a ground fault. The processing circuit determines the fundamental parts of the ground fault current and voltage to compute the phase difference $\phi$ between the two parts and the $\cos \phi$ value. The evolution of this phase difference is representative of a fault.

7 Claims, 6 Drawing Sheets

GROUND FAULT MONITORING DEVICE FOR AN ELECTRICAL POWER DISTRIBUTION SYSTEM

BACKGROUND Of THE INVENTION

The invention relates to a ground fault monitoring device for an electrical power distribution system comprising means for measuring, filtering, sampling and analog-to-digital conversion of the residual voltage of an electrical power distribution system, means for measuring, filtering, sampling and analog-to-digital conversion of the residual current, means for synchronizing sampling of the residual voltage and current, a digital processing circuit connected to conversion outputs and supplying a fault signal.

Monitoring devices for protection against ground faults are designed to actuate indicators or to bring about opening of the line on which a fault has been detected. These devices can be found on several types of power systems which are differentiated by the voltage level (low voltage, medium voltage, high and extra high voltage) and type of common conductor (neutral) earthing, notably: isolated neutral, earthed neutral, impedant neutral or compensated neutral. A ground fault is defined by a short-circuit between one or more active lines of the power system (phases) and earth. As a general rule, ground fault current detection is performed by measuring a residual current in the phases of the line to be monitored. But this measurement is not always sufficient as the lines of great length have with earth line capacitances which generate reactive ground fault currents. The residual voltage of the power system therefore has to be measured to enable the active part and the reactive part of the ground fault current to be extracted.

State-of-the-art monitoring devices for protection against ground faults are based on detection of the active residual power or of the active residual current. Their operating mode is adapted to steady-state operating conditions and does not enable fault detection in transient operating conditions. Certain complementary solutions have also been proposed for fault detection in transient operating conditions, using instantaneous signals. This processing is very complex, and therefore costly.

SUMMARY OF THE INVENTION

The object of the invention is to achieve a device enabling the presence of a ground fault to be detected as soon as the transient operating conditions caused by this fault appear. This detection naturally remains effective when a continuous fault regime is established.

According to the invention, this object is achieved by the fact that the processing circuit comprises means for computing, at each sampling period, the fundamental components of the ground fault current and voltage observed on a window of a duration equivalent to the period of the power system to be protected, so as to supply a first quantity representative of the phase difference between said fundamental components of the current and voltage, first means for comparison between the first quantity and a first threshold, means for determining a second quantity representative of the evolution of the result of the first comparison and second means for comparison of the second quantity with a second preset threshold, and means for producing the fault signal when said second threshold is exceeded.

According to a preferred embodiment, the means for determining the second quantity comprise counting means.

According to a development of the invention, the processing circuit comprises means for modifying the content of the counting means, the modifying means comprising means for adding a first value to the counter content if the result of the first comparison is positive, and means for adding a second value to the counter content if the result of the first comparison is negative, the first and second value being of different signs.

BRIEF DESCRIPTION OF THE DRAWINGS

Other advantages and features will become more clearly apparent from the following description of an illustrative embodiment of the invention, given as a non-restrictive example only and represented in the accompanying drawings in which.

DESCRIPTION OF THE PREFERRED EMBODIMENT

Figure 1:
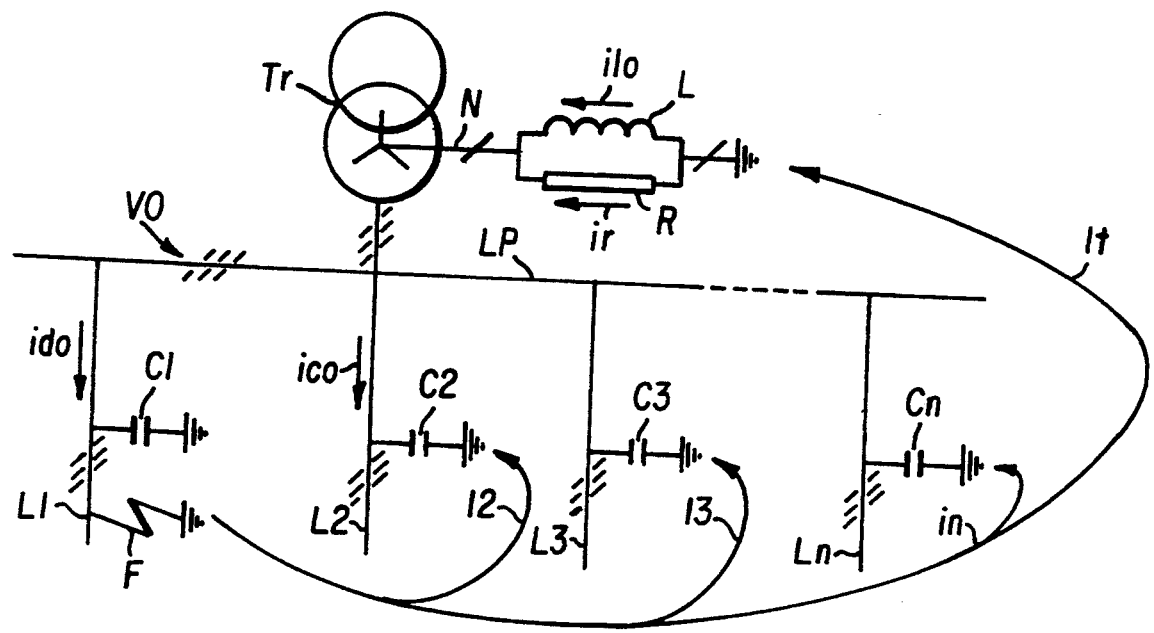
FIG. 1 represents a three-phase electrical power distribution system to which the invention can be applied.

FIG. 1 represents the diagram of a three-phase electrical power distribution system in which a transformer Tr at the head of the line supplies a main line LP, itself connected to different distribution lines or feeders L1 to Ln. The transformer Tr is star-connected on the secondary, the three secondary windings being on the one hand connected to one of the three phases of the main line LP and on the other hand connected to a common neutral conductor N. The neutral conductor N is earthed via a compensating induction coil L having a resistive part represented as R.

The distribution lines L1 to Ln have with earth respective line capacitances C1 to Cn. In state-of-the-art manner, the capacitive reactive currents ico generated by these line capacitances are compensated by an inductive reactive current ilo created by the compensating induction coil L. The value of the induction coil is determined in such a way as to have $LW = \frac{1}{3} CtW$ where L represents the value of the compensating induction coil, Ct the value of the total sum of the line capacitances and $W = 2\pi f$, f being the frequency of the power system.

When a line is affected by an earth fault F, the corresponding feeder, L1 in the case in the figure, is affected by a ground fault and a residual ground fault voltage vo occurs between the main line phases and earth. The faulty line L1 then behaves as a ground fault generator. The fault current ido generates reactive currents I1 to In in the sound feeders, and an earth current IT breaking down into an active current ir in the resistance R and a reactive current ilo in the induction coil L.

In state-of-the-art manner, the residual ground fault voltage corresponds to the vector sum of the voltages of the 3 phases with respect to earth and measurement of the residual ground fault current is obtained by the vector sum of the currents of the three phases of the line.

Passing from one stable or continuous regime without a fault to another stable regime with a ground fault where all the electrical voltage and current quantities are sinusoidal causes a transient regime with unstable operation the duration of which depends on the fault. During this transient regime the ground fault voltage and current are no longer sinusoidal and measuring the phase difference between the current and voltage to determine the active part of the current is difficult to achieve.

Figure 2:
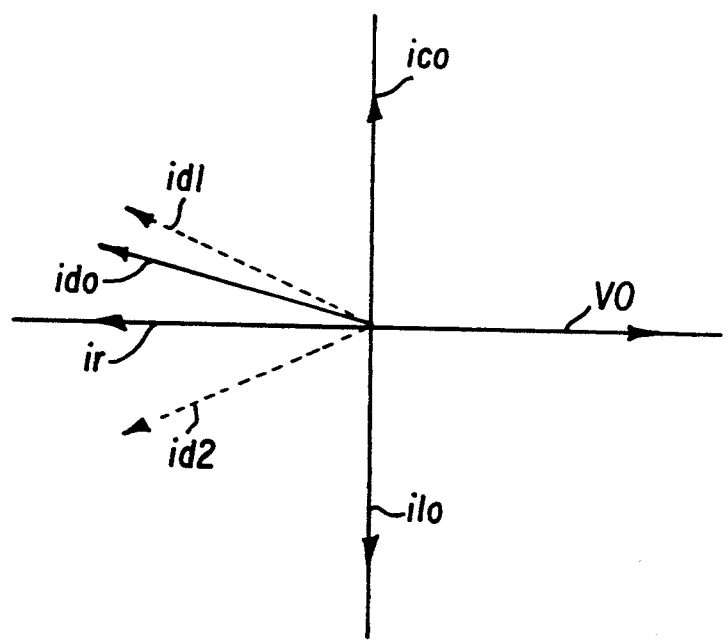
FIG. 2 indicates the phase difference between the ground fault voltage and the ground fault currents flowing in a sound feeder and a faulty feeder in steady-state operating conditions.

FIG. 2 indicates, for a stable and continuous operating regime, the phase difference between the ground fault voltage vo and, respectively, the capacitive current ico in a given sound feeder, the inductive current ilo and the active current ir. According to the precision of the compensation between the capacitances C1 to Cn and the induction coil L, the current in the faulty feeder ido can vary between the values id1 and id2 whose phase difference with respect to vo is not exactly 180°.

Figure 3:
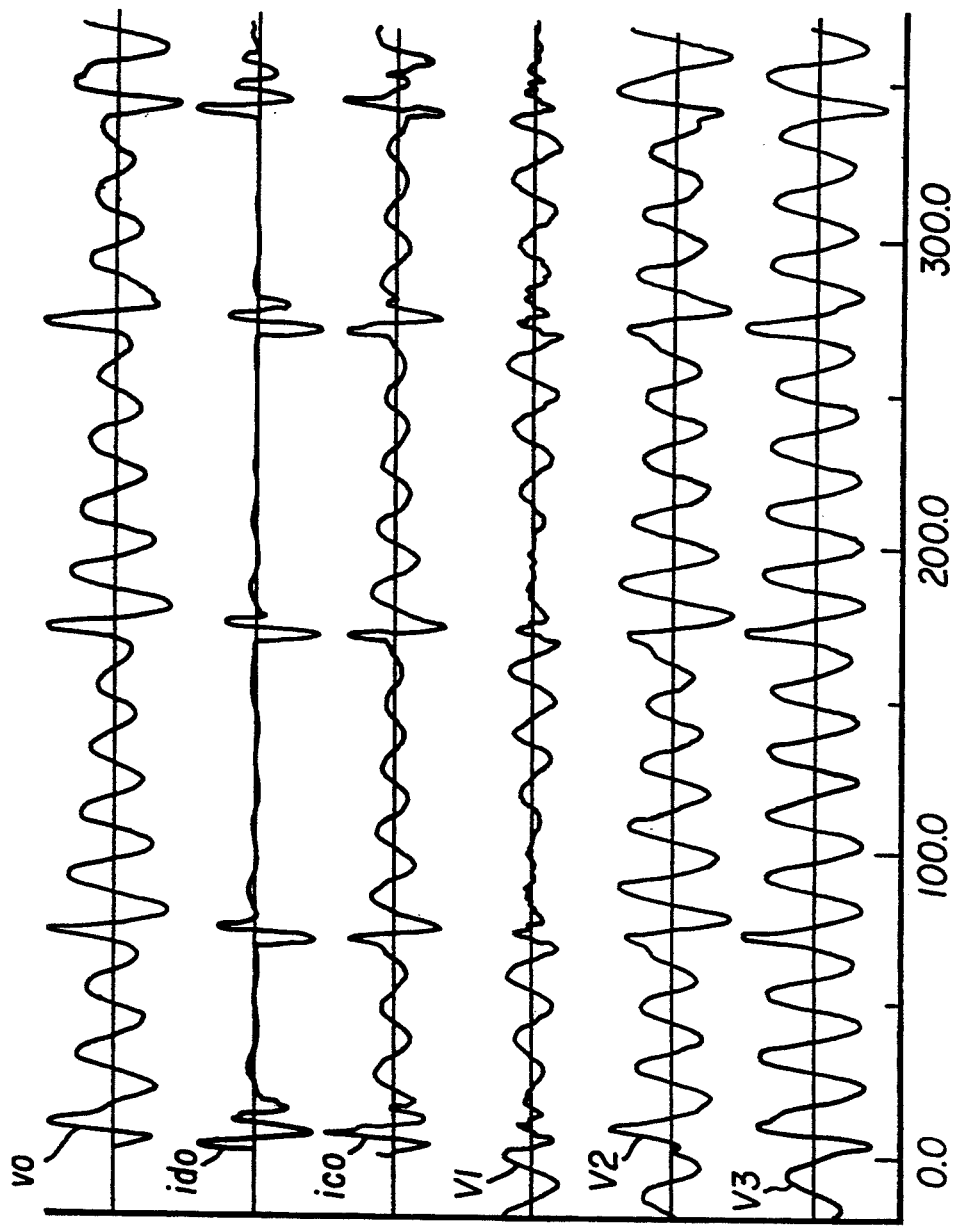
FIG. 3 shows an actual representation of the voltages and currents in the power distribution system.

An actual representation of the voltages and currents in the power system is shown in FIG. 3. The voltages of the different phases of the main line LP are represented by V1, V2 and V3, vo is the vector sum of the voltages V1, V2 and V3 in normal operation, this voltage vo is zero. If a fault occurs on at least one phase of a feeder line, the voltage of the corresponding phase, for example V2, decreases and the ground fault voltage vo increases. The occurrences of faults F visible on the ground fault current signal ido alter the sinusoidal forms of the other signals, notably those of ico corresponding to the capacitive ground fault current of a sound feeder and of the ground fault voltage vo.

According to the invention, the ground fault voltage vo and the ground fault current io are sampled then observed according to a window of known type (rectangular, Hamming, Hanning, ... ). The duration of this observation window is $T = 1/fr$ where fr is the fundamental frequency of the power system to be protected. From this observation, computation of a Fourier series development enables the fundamental components Vo of the ground fault voltage vo and Io of the ground fault current io to be obtained. The components Vo and Io are strongly dependent on the observation time T. A quantity representative of the phase difference $\phi$ between the fundamental components Vo and Io is then computed. The evolution of this quantity enables a ground fault to be detected.

Figure 4A:
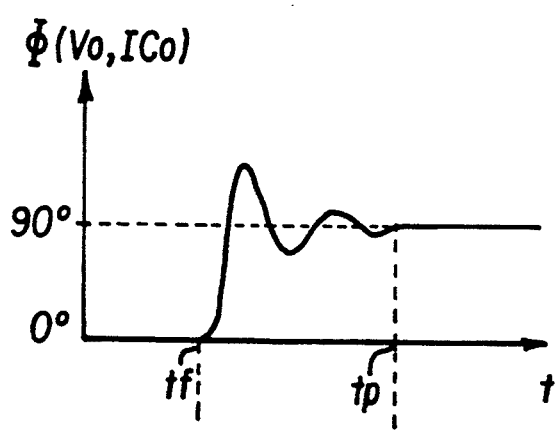
FIGS. 4A–B shows in detail the phase difference variations between the fundamental components Vo, I Co, IDo of the ground fault voltage and ground fault currents when a fault occurs.
Figure 4B:
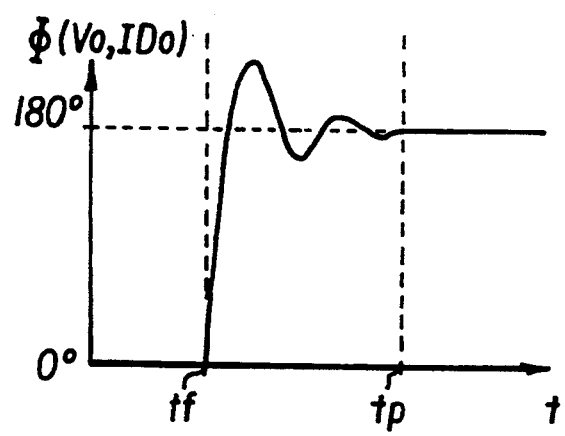

FIGS. 4A-B shows in greater detail the phase difference variations between the fundamental component Vo of the voltage vo and respectively the fundamental component ICo of the current of a sound feeder ico and the fundamental component IDo of the current of a faulty feeder .ido. At a time tf of occurrence of a fault, the phase difference $\phi(Vo, ICo)$ of a sound feeder tends towards 90° and the phase difference $\phi(Vo, IDo)$ of a faulty feeder tends towards 180° being subjected to oscillations.

Analysis of these phase differences enables it to be deduced that when a fault occurs, the phase difference cosine cos $\phi$ is positive for a sound feeder as the phase difference $\phi(Vo, ICo)$ is still less than 90° whereas for a faulty feeder the sign of cos $\phi$ quickly takes a negative value, the phase difference being close to 180°.

Figure 5:
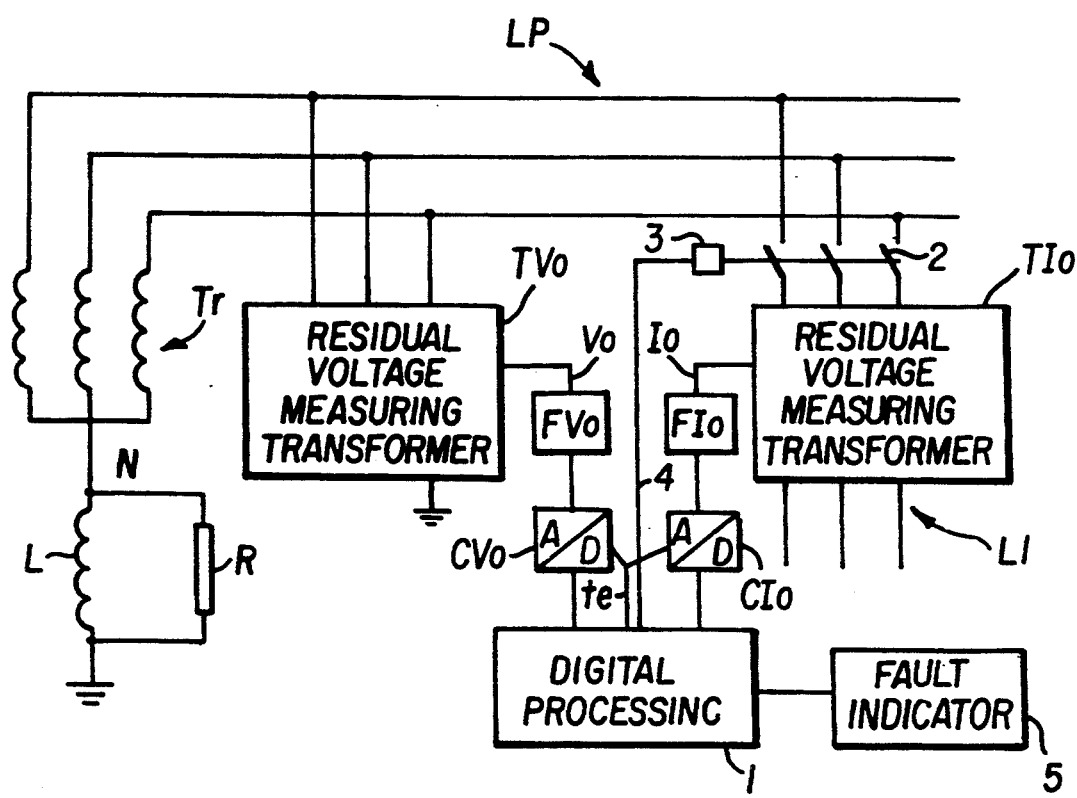
FIG. 5 represents the general diagram of a measuring device associated with a feeder L1 of the power distribution system according to FIG. 1.

According to a preferred embodiment of the invention, determining the phase difference is performed at each sampling period. Computation of the fundamental components of the current Io and voltage Vo is performed by observation of the samples collected on a window having a duration equivalent to that of the power system to be monitored. In a digital processing system, such as the one used in the preferred embodiment described below, the voltage vo and current io are sampled simultaneously. A particular embodiment of the measuring device associated with the feeder L1 is represented in block diagram form in FIG. 5. The main line LP supplies the feeder line L1 via an interruption means 2, for example a circuit breaker, opening of which can be controlled by a trip circuit 3. Measuring of the residual voltage vo is performed on the main line LP by means of a residual voltage measuring transformer TVo of state-of-the-art type. This residual voltage vo is filtered by an aliasing filter FVo then sampled and converted by an analog-to-digital converter CVo. Measuring of the residual current io is performed by means of a residual current measuring transformer TIo of state-of-the-art type. This current io is filtered by an aliasing filter FIo then sampled and converted by an analog-to-digital converter CIo. The converters CVo and CIo perform the sampling simultaneously with a period te. A digital processing circuit to which the output signals from the converters CVo and CIo are applied computes the fundamental part's Io and Vo of the ground fault current and voltage and their phase difference. Then, according to pre-established criteria disclosed in greater detail below, it indicates the presence of a ground fault by means of a fault indicator 5 and/or gives a tripping order 4 to the trip circuit 3 for opening of the interruption means 2. In FIG. 5, the circuit 1 also monitors the simultaneous sampling of the signals vo and io.

Figure 6:
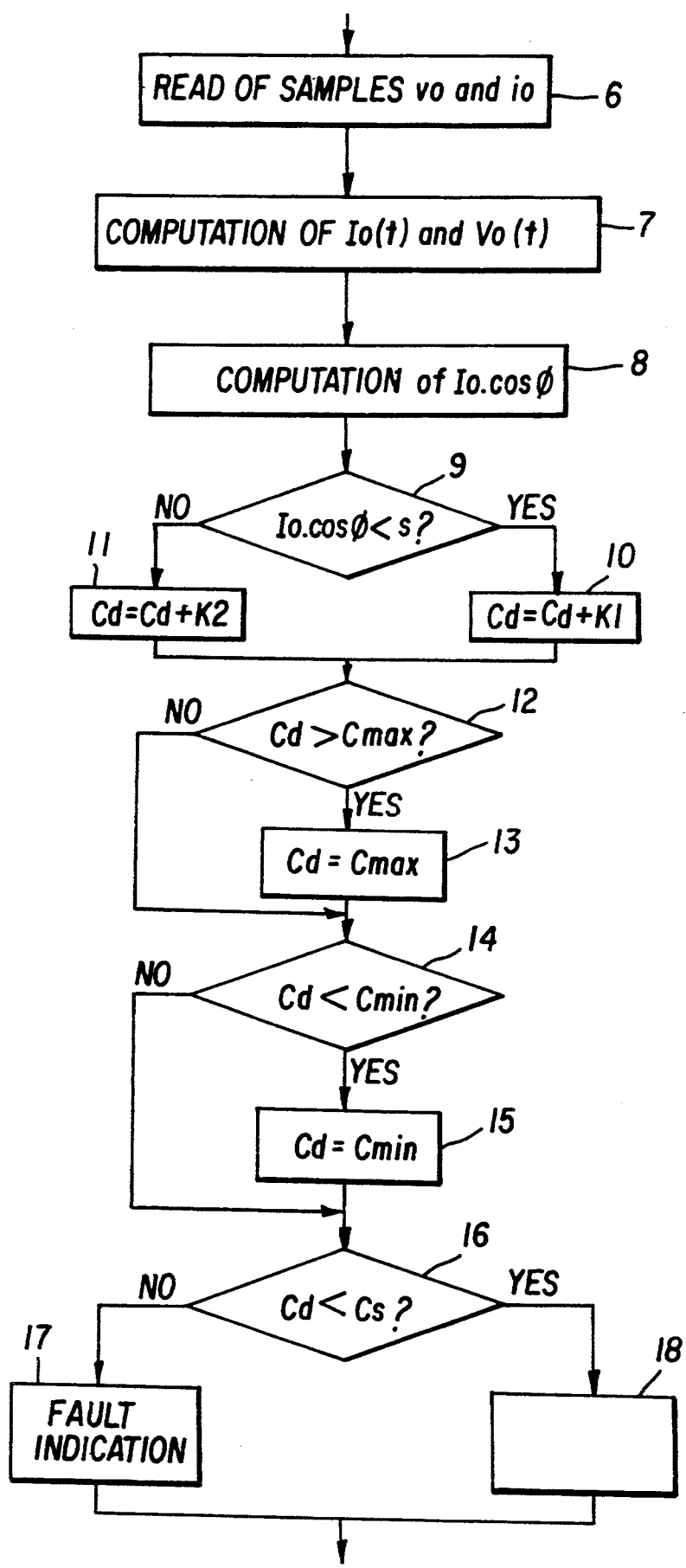
FIG. 6 represents an example of a flow chart used by the digital processing circuit of the device according to FIG. 5.

FIG. 6 represents a flow chart used by the digital processing circuit 1. The ground fault current io and voltage vo, sampled with a sampling period te, are read (stage 6) by the processing circuit. Extraction of the fundamental components Io and Vo of the current io and voltage vo is performed at stage 7. These components are then used (stage 8) for computing the phase difference. This processing is performed for each sampling period taking account of the T/re previous samples corresponding to the observation window of period T. The value of Io cos $\phi$ is compared with a threshold S=0 (stage 9) to detect the presence of a short duration fault. If Io cos $\phi$ is lower than the threshold S, the content of the fault positioning counter Cd is modified by a constant value K1 (stage 10). In the opposite case, the content of the counter Cs is then modified by a constant value K2 (stage 11). For the counter Cd to remain within a zone of visibility, a high limitation and a low limitation are provided. At stage 12, the content of the counter Cd is compared with a maximum value Cmax. If Cd is greater than Cmax, the content of the counter is replaced by Cmax (stage 13). At stage 14 the content of the counter Cd is compared with a minimum value Cmin. If Cd is lower than Cmin, the content of the counter is replaced by Cmin (stage 15). A threshold value Cs, comprised between the maximum value Cmax and minimum value Cmin of Cd enables the existence of a fault to be indicated. The result of the comparison (stage 16) between Cd and Cs enables processing to be directed towards whichever of the stages 17 or 18 is appropriate. Fault detection can be used for control of the fault indicator 5 and possibly to trigger the trip device 3 if the fault is present during a preset time. If, as in the example below, the sign of the constant K1 is negative and the sign of the constant K2 is positive, stage 17 corresponds to detection of a long duration fault.

Figure 7A:
FIGS. 7A–C and 8A–C represent, versus time, quantities obtained in the device according to FIG. 5, respectively when the feeder is or is not affected by a ground fault.
Figure 7B:
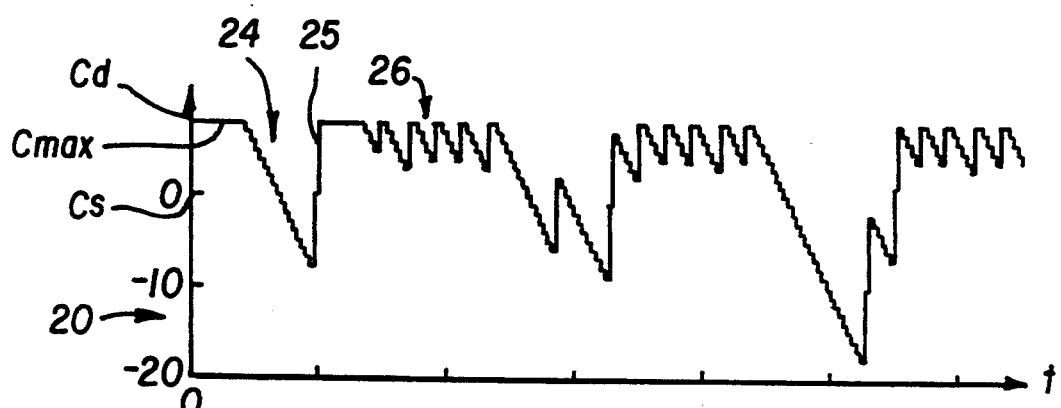
Figure 7C:
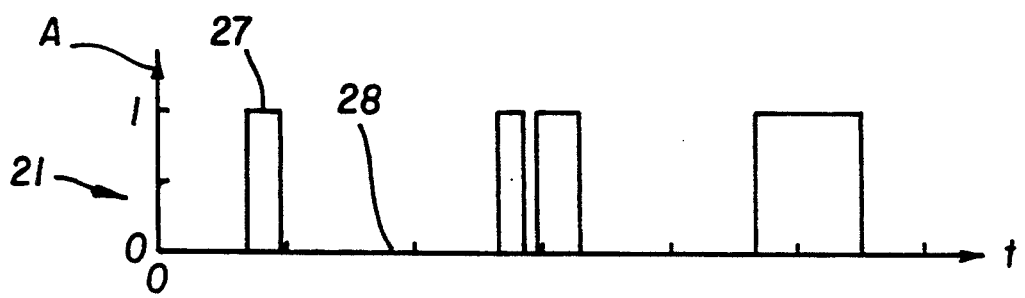

FIGS. 7A-C illustrates the quantities obtained in a particular embodiment when the feeder involved is affected by a ground fault. In this example the counter parameters are as follows: $S=0$, $Cmax=8$, $Cmin=-24$, $Cs=0$, $K1=-1$ and $K2=8$. When the comparison threshold S of Io $\phi$ is equal to zero, this comparison can be reduced to the sign of cos $\phi$. Curve 19 represents the values of the active part Ioa of the fundamental component Io of the ground fault current io. Curve 20 indicates the variations of Cd in terms of the sign of the current Ioa. A signal A representative of the result of the comparison with the threshold Cs, which in the particular embodiment represented in the figure corresponds to switching to a negative value of the counter content, is indicated on curve 21. This signal takes a first value 27 when Cd is lower than Cs. Otherwise it remains at a second value 28, which is zero in the figure.

FIGS. 7A-C illustrates the quantities corresponding to a faulty feeder. In curve 19, when Ioa is negative (zone 22), the counter content Cd is modified by $+K1$ ($Cd=Cd-1$), and therefore decreases at each computation step (zone 24). If the fault is cleared, Ioa becomes zero again and the counter content Cd quickly returns towards its rest value (zone 25) with steps equivalent to K2, i.e. $Cd=Cd+8$. By choosing the values of K1 and K2, small oscillations of Ioa around zero (zone 23) do not enable Cd to drop below the threshold value Cs (zone 26). When Cd drops below the threshold Cs, i.e. when Cd is negative, the signal A takes its first value 27 throughout the duration of the overshoot.

Figure 8A:
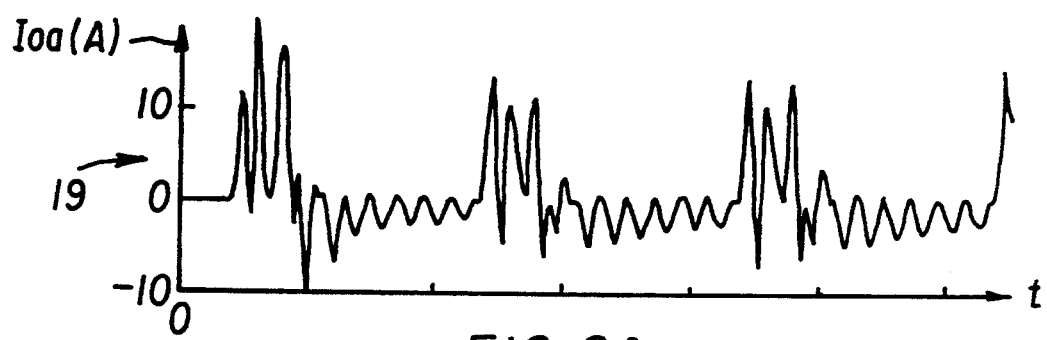
Figure 8B:
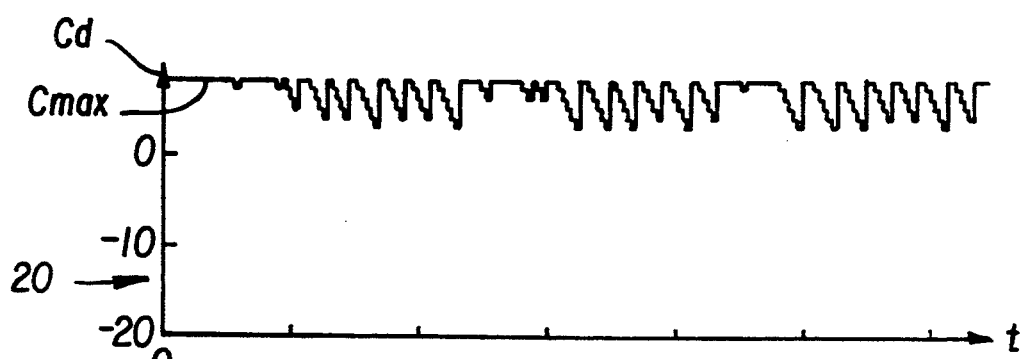
Figure 8C:
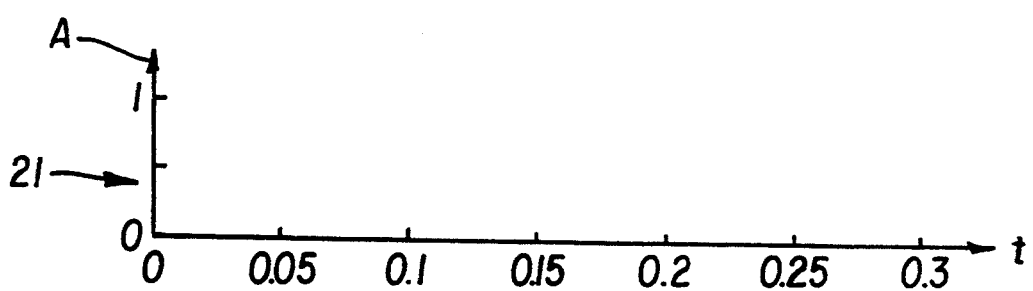

FIGS. 8A-C illustrates the same quantities as FIG. 7, in the case where the ground fault is not on the feeder involved. The values of the active current component Ioa can oscillate around 0. The variations of Cd are slight and return to $+8$ (Cdmax) each time Ioa goes to a positive value. The threshold Cs is never exceeded and the signal A keeps its second value 28.

The above description corresponds to monitoring of a feeder line. It implies that the whole measuring, conversion and processing system has to be installed for each feeder line. Other embodiments of the invention make it possible to reduce the quantity of equipment required for more generalized monitoring of the power system. A first grouping consists in using a common residual voltage transformer connected to the main line and giving the ground fault voltage measurement to each feeder line monitoring device. Another embodiment in addition enables the digital processing to be centralized for several feeders. In this case, the digital processing processes all the feeders, there is a single ground fault voltage measuring channel, but the residual current measurements and the tripping orders are different for each feeder.

The parts representative of the phase difference between the fundamental ground fault current and voltage components Io, Vo can be presented in several forms, notably the direct value of the phase difference $\phi$, the phase difference cosine cos $\phi$, the value of the active part of the fundamental component Ioa or the value of Io cos $\phi$. In each of the above cases, the comparison threshold S will be adapted to the value to be compared.

We claim:

1. A ground fault monitoring device for an electrical power distribution system comprising:
    ground fault voltage means for measuring, filtering, sampling and analog-to-digital conversion of the residual ground fault voltage of an electrical power distribution system to generate a digitized residual ground fault voltage signal,
    ground fault current means for measuring, filtering, sampling and analog-to-digital conversion of the residual ground fault current to generate a digitized residual ground fault current signal,
    means for synchronizing sampling of the digitized residual voltage and current signals,
    computing means for computing, at each sampling period, the fundamental components of the residual ground fault current and voltage observed on a window of a period equivalent to the period of the power distribution system, so as to supply a first quantity representative of the phase difference between said fundamental components of the current and voltage,
    first comparing means for comparing the first quantity and a first preset threshold,
    determining means for determining a second quantity in terms of the result of the comparison performed by the first comparing means, and
    second comparing means for comparing the second quantity with a second preset threshold,
    and fault signal means for producing at least one of a fault signal and a tripping signal when said second quantity exceeds said second preset threshold.

2. The device according to claim 1, wherein the means for determining the second quantity comprise counting means.

3. The device according to claim 2, further comprising means for modifying the content of the counting means, the modifying means comprising means for adding a first value to the counter content if the result of the first comparison is positive, and means for adding a second value to the counter content if the result of the first comparison is negative, the first and second value being of different signs.

4. The device according to claim 2, further comprising means for limiting the content of said counting means to a maximum value and a minimum value.

5. The device according to claim 1, further comprising trip means responsive to the trip signal for preventing the flow of current in the distribution system.

6. The device according to claim 1, wherein the power distribution system includes a plurality of feeder lines connected to a main line, the ground fault current means measures the residual current respectively associated with each of the feeder lines, the ground fault voltage means measures the residual voltage of the main line, and the fault signal means produces fault signals and trip signals for each of the feeder lines.

7. The device according to claim 1, further comprising a fault indicator means responsive to the fault signal for indicating a fault condition.

* * * * *